United States Patent
Maekawa et al.

(10) Patent No.: US 9,640,798 B2
(45) Date of Patent: May 2, 2017

(54) NONAQUEOUS ELECTROLYTE SECONDARY BATTERY

(71) Applicant: SANYO Electric Co., Ltd., Daito-shi, Osaka (JP)

(72) Inventors: Masanori Maekawa, Tokushima (JP); Yasunobu Iwami, Tokushima (JP); Akira Kinoshita, Tokushima (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 167 days.

(21) Appl. No.: 14/434,317

(22) PCT Filed: Oct. 25, 2013

(86) PCT No.: PCT/JP2013/006326
§ 371 (c)(1),
(2) Date: Apr. 8, 2015

(87) PCT Pub. No.: WO2014/068930
PCT Pub. Date: May 8, 2014

(65) Prior Publication Data
US 2015/0270553 A1    Sep. 24, 2015

(30) Foreign Application Priority Data
Oct. 30, 2012 (JP) ................................. 2012-239290

(51) Int. Cl.
*H01M 4/62* (2006.01)
*H01M 10/0525* (2010.01)

(52) U.S. Cl.
CPC ............. *H01M 4/623* (2013.01); *H01M 4/62* (2013.01); *H01M 4/625* (2013.01); *H01M 10/0525* (2013.01); *Y02E 60/122* (2013.01); *Y02T 10/7011* (2013.01)

(58) Field of Classification Search
CPC ........ H01M 4/623; H01M 4/62; H01M 4/625; H01M 10/0525; Y02E 60/122; Y02T 10/7011
See application file for complete search history.

(56) References Cited

U.S. PATENT DOCUMENTS

| | | | |
|---|---|---|---|
| 6,228,533 B1 | 5/2001 | Ohashi et al. | |
| 2005/0069778 A1 | 3/2005 | Bonnet et al. | |
| 2011/0159366 A1 | 6/2011 | Nakura | |
| 2011/0223492 A1 | 9/2011 | Sakitani et al. | |

FOREIGN PATENT DOCUMENTS

| | | |
|---|---|---|
| CN | 1212076 A | 3/1999 |
| CN | 1590479 A | 3/2005 |
| JP | 2002-134113 A | 5/2002 |
| JP | 2010-033957 A | 2/2010 |
| JP | 2010-097817 A | 4/2010 |
| JP | 2011-192395 A | 9/2011 |
| WO | 2011/001666 A1 | 1/2011 |

OTHER PUBLICATIONS

International Search Report dated Jan. 21, 2014, issued in corresponding application No. PCT/JP2013/006326.
English Translation of Chinese Search Report dated Jul. 20, 2016 for the related Chinese Patent Application No. 201380039978.2. (2 pages).

*Primary Examiner* — Laura Weiner
(74) *Attorney, Agent, or Firm* — Westerman, Hattori, Daniels & Adrain, LLP

(57) ABSTRACT

A nonaqueous electrolyte secondary battery according to one aspect of the present invention contains a dispersant in a positive electrode mixture layer. The content of a positive electrode active material in the positive electrode mixture layer is 97% by mass or more, and the content ratio of a conductive agent to a binder in the positive electrode mixture layer is 1.00-1.67. The binder is composed of a polyvinylidene fluoride which has a carboxyl group or a carboxyl group derivative as a terminal functional group.

1 Claim, 1 Drawing Sheet

NONAQUEOUS ELECTROLYTE SECONDARY BATTERY

TECHNICAL FIELD

The present invention relates to a nonaqueous electrolyte secondary battery with an increased content of a positive electrode active material in a positive electrode mixture layer.

BACKGROUND ART

Nonaqueous electrolyte secondary batteries, typified by lithium-ion secondary batteries which have a high energy density and are of high capacity, are widely used as power supplies for driving the present-day portable electronic devices such as mobile phones, mobile personal computers, and mobile music players and as power supplies for hybrid electric vehicles (HEVs and PHEVs) and electric vehicles (EVs).

These nonaqueous electrolyte secondary batteries, in general, have a positive electrode plate and a negative electrode plate. The positive electrode plate is composed of a positive electrode core, such as an elongated sheet of aluminum foil, and a positive electrode mixture layer formed on both sides of the core, the mixture layer containing a positive electrode active material which stores and releases lithium ions. The negative electrode plate is composed of a negative electrode core, such as an elongated sheet of copper foil, and a negative electrode mixture layer formed on both sides of the core, the mixture layer containing a negative electrode active material which stores and releases lithium ions. These nonaqueous electrolyte secondary batteries are manufactured by, as also disclosed in PTL 1 below for example, winding a positive electrode plate and a negative electrode plate into a cylindrical shape or an ellipsoidal shape with the two plates isolated from each other by a separator to form a wound electrode body, optionally compressing the wound electrode body form a flat wound electrode body if the battery is a prismatic one, connecting a positive electrode tab and a negative electrode tab to a predetermined portion of the positive electrode plate and the negative electrode plate, respectively, and then covering the outside with a sheathing body.

CITATION LIST

Patent Literature

PTL 1: Japanese Published Unexamined Patent Application No. 2011-192395
PTL 2: Japanese Published Unexamined Patent Application No. 2010-97817

SUMMARY OF INVENTION

Technical Problem

Nonaqueous electrolyte secondary batteries, which have a high energy density and high capacity, must always be improved in terms of the battery capacity per volume or per mass. An example of a method for increasing the battery capacity per volume or per mass of a nonaqueous electrolyte secondary battery is to increase the content of the active materials in the active material mixture layers formed on the electrode plates. However, increasing the content of the active materials means reducing the relative content of a conductive agent and a binder. The difficulty in keeping the battery electrode plates in their normal condition therefore increases proportionally with increasing content of the active materials.

As a result, for the known nonaqueous electrolyte secondary batteries such as those described in PTL 1 above, it has been difficult to improve their characteristics for use as nonaqueous electrolyte secondary batteries even by, for example, reducing the content of the binder in the positive electrode mixture layers on the positive electrode plate so as to increase the relative content of the positive electrode active material to 95% by mass or more.

According to one aspect of the present invention, a nonaqueous electrolyte secondary battery can be provided which has, owing to the use of a polyvinylidene fluoride (PVdF)-based resin having a carboxyl group as a binder, excellent cycle characteristics even if the content of a positive electrode active material in a positive electrode mixture layer is 97% by mass or more.

PTL 2 above discloses a positive electrode mixture paste for lithium secondary batteries containing a PVdF-based resin having a carboxyl group and a lithium secondary battery in which this paste is used, but suggests nothing about increasing the content of a positive electrode active material to 95% by mass or more and the resulting cycle characteristics etc.

Solution to Problem

According to one embodiment of the present invention, a nonaqueous electrolyte secondary battery is provided which has a positive electrode plate, a negative electrode plate, a nonaqueous electrolyte solution, and a separator, the positive electrode plate having a positive electrode mixture layer formed thereon containing a positive electrode active material which stores and releases a lithium ion, a conductive agent, and a binder, and the negative electrode mixture layer containing a negative electrode active material which stores and releases a lithium ion. The positive electrode mixture layer contains a dispersant, and the content of the positive electrode active material in the positive electrode mixture layer is 97% by mass or more. The content ratio of the conductive agent to the binder in the positive electrode mixture layer is 1.00-1.67, and the binder is composed of a PVdF which has a carboxyl group or a carboxyl group derivative as a terminal functional group.

Advantageous Effects of Invention

According to a nonaqueous electrolyte secondary battery according to one embodiment of the present invention, a nonaqueous electrolyte secondary battery is obtained which offers improved cycle characteristics even if the content of a positive electrode active material in a positive electrode mixture layer is 97% by mass or more.

DESCRIPTION OF EMBODIMENTS

Figure 1:
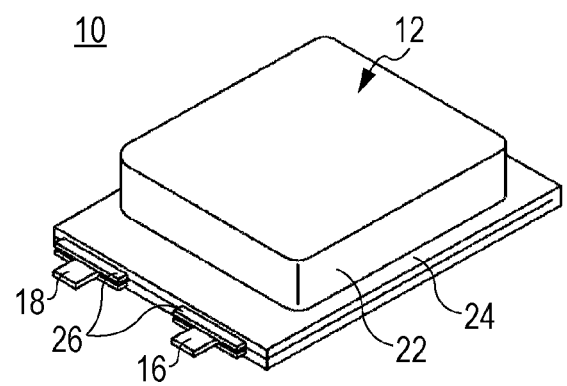
FIG. 1 is a perspective view of a laminated nonaqueous electrolyte secondary battery according to one embodiment.
Figure 2:
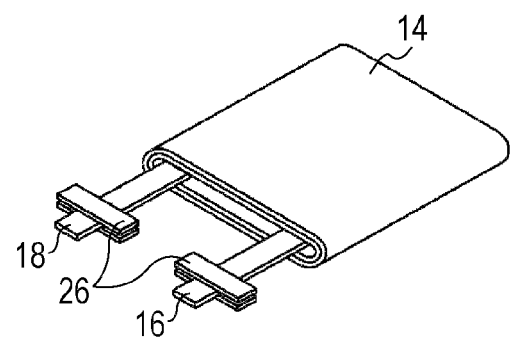
FIG. 2 is a perspective view of the wound electrode body in FIG. 1.

The following describes an embodiment of the present invention in detail. This embodiment is an example given to make the technical ideas behind the present invention understood and is not intended to limit the present invention thereto. The present invention can be equivalently applied even after various modifications made without departing from the technical ideas presented in the claims. The methods by which the laminated nonaqueous electrolyte secondary batteries used in Experimental Examples 1 to 15 were prepared are described first.

[Production of Positive Electrode Plates]

The lithium-cobalt composite oxide ($LiCoO_2$)-based positive electrode active material used in Experimental Examples 1 to 10 and 13 to 15 were prepared as follows. Tricobalt tetraoxide ($Co_3O_4$) obtained through thermal decomposition reaction of cobalt carbonate ($CoCO_3$) was used as a cobalt source. This was mixed with lithium carbonate ($Li_2CO_3$) as a lithium source, and the mixture was fired in an air atmosphere at 850° C. for 20 hours, yielding the lithium-cobalt composite oxide. This was pulverized to an average particle diameter of 14 μm in a mortar.

The positive electrode active material used in Experimental Examples 11 and 12, based on a cobalt-containing lithium-nickel-manganese composite oxide ($LiNi_{0.5}Co_{0.2}Mn_{0.3}O_2$), was prepared as follows. Lithium carbonate ($Li_2CO_3$) as a lithium source and a coprecipitated hydroxide represented by $Ni_{0.5}Co_{0.2}Mn_{0.3}(OH)_2$ as a transition metal source were used as starting materials. Predetermined amounts of these were weighed and mixed, and the mixture was fired in an air atmosphere at 1000° C. for 20 hours, yielding the cobalt-containing lithium-nickel-manganese composite oxide represented by $LiNi_{0.5}Co_{0.2}Mn_{0.3}O_2$. This was pulverized to an average particle diameter of 5 μm in a mortar.

The lithium-cobalt composite oxide or cobalt-containing lithium-nickel-manganese composite oxide as a positive electrode active material prepared in this way, carbon black as a conductive agent, and a PVdF power or a powder of a PVdF having a carboxyl group as a terminal functional group as a binder were dispersed in N-methyl-2-pyrrolidone (NMP) with or without 0.5% by mass methyl cellulose as a dispersant in accordance with the predetermined proportions indicated in Tables 1 to 4. Through this, positive electrode active material mixture slurries were prepared.

The procedure under which the positive electrode active material mixture slurries with methyl cellulose-containing NMP were prepared included mixing methyl cellulose in a fraction of the NMP beforehand, mixing in the conductive agent to produce a paste, adding the positive electrode and the binder and mixing the paste, and finally adding the rest of the NMP and mixing the paste into a slurry.

The positive electrode active material mixture slurries obtained as above were applied to both sides of a 15 μm thick aluminum positive electrode collector in a uniform thickness using the doctor blade method. Then the positive electrode collector was passed through an oven so that NMP was dried off and positive electrode mixture layers were formed on the collector. Then this positive electrode plate was rolled using a roll press machine and cut out into a predetermined size. In this way, positive electrode plates for use in Experimental Examples 1 to 15 were produced.

[Production of a Negative Electrode Plate-1]

The negative electrode plate common to Experimental Examples 1 to 12, 14, and 15 was produced as follows. A graphite powder as a negative electrode active material, carboxymethyl cellulose (CMC) as a thickener, and styrene butadiene rubber (SBR) as a binder were uniformly mixed in proportions of 95:3:2 (mass ratios). A negative electrode active material mixture slurry was prepared through the dispersion of this mixture in an adequate amount of water. This negative electrode active material mixture slurry was applied to both sides of a 10-μm thick negative electrode collector made from copper foil using the doctor blade method. Then the negative electrode collector was passed through an oven so that water was dried off and a negative electrode active material mixture layer was formed on both sides of the collector. Then the negative electrode plate was rolled using a roll press machine and cut out into a predetermined size. In this way, a negative electrode plate for common use in Experimental Examples 1 to 12, 14, and 15 was produced.

[Production of a Negative Electrode Plate-2]

The negative electrode plate for Experimental Example 13 was produced as follows.

(1) Preparation of a Silicon Oxide Negative Electrode Active Material

Particles with a composition of $SiO_x$ (x=1), pulverized and classified in such a manner that the particle size was adjusted to an average particle diameter of 6 μm, were heated to approximately 1000° C., and the surface of these particles was coated with carbon in an argon atmosphere using the CVD method. A silicon oxide negative electrode active material was prepared through the disintegration and classification of the obtained particles.

Whether or not the surface of $SiO_x$ is subjected to a process of coating with a carbon material and the process temperature at which the process of coating with a carbon material is performed are not critical. If the surface of $SiO_x$ is subjected to a process of coating with a carbon material, well-known methods can be directly used. However, it is preferred that $SiO_x$ be subjected to a process of coating with a carbon material, more preferably with the amount of coating being 1% by mass or more of the silicon oxide particles including the carbon material. The average particle diameter of SiO was measured using a laser diffraction particle size analyzer (Shimadzu Corporation SALD-2000A) in water as a dispersion medium, with the refractive index assumed to be 1.70-0.01i. The average particle diameter was defined as a particle diameter at which the cumulative amount of particles is 50% by volume.

(2) Preparation of a Graphite Negative Electrode Active Material

Artificial graphite flakes to serve as cores and petroleum pitch as a carbon precursor to coat the surface of these cores and turn into amorphous carbon were prepared. These were mixed in an inert gas atmosphere while being heated, and the mixture was then pulverized, and the resulting particles were classified. In this way, graphite was prepared with an average particle diameter of 22 μm and its surface coated with amorphous carbon.

(3) Production of a Negative Electrode Plate

The graphite and silicon oxide prepared in this way were mixed in such a manner that the mass ratio was 96.5:3.5, and the obtained silicon oxide-containing graphite was used as a negative electrode active material. A negative electrode active material mixture slurry was prepared by dispersing this negative electrode active material, carboxymethyl cellulose (CMC) as a thickener, and styrene butadiene rubber (SBR) as a binder in water in such a manner that the mass ratios negative electrode active material (graphite+SiO): CMC:SBR were 97:1.5:1.5. This negative electrode active material mixture slurry was applied to both sides of an 8-μm thick copper collector using the doctor blade method to form negative electrode active material mixture layers. After water was removed through drying, the collector was rolled using compression rollers to a predetermined thickness and cut into a predetermined size. In this way, a negative electrode plate for use in Experimental Example 13 was produced.

[Production of a Wound Electrode Body]

A collector tab was welded to each of the positive and negative electrode plates according to each experimental example prepared as above, and then the electrode plates were wound using a winding machine with a 12-μm thick polyethylene microporous film as a separator interposed therebetween. The wound assembly was then pressed with an insulating binding tape attached to the portion where winding ended. In this way, a flat wound electrode body according to each experimental example was produced.

[Preparation of a Nonaqueous Electrolyte Solution]

As for the nonaqueous electrolyte solution, ethylene carbonate (EC) and methyl ethyl carbonate (MEC) were mixed in such a manner that the volume ratio at 1 atm and 25° C. was 70:30, and lithium hexafluorophosphate ($LiPF_6$) as an electrolytic salt was dissolved in the resulting nonaqueous solvent to make 1 mol/L. In this way, a nonaqueous electrolyte solution for common use in Experimental Examples 1 to 15 was prepared.

[Production of a Nonaqueous Electrolyte Secondary Battery]

A sheet-shaped laminated material having a five-layer structure of a plastic layer (polypropylene)/an adhesive agent layer/an aluminum alloy layer/an adhesive agent layer/a plastic layer (polypropylene) was prepared, and this laminated material was folded to form a bottom portion and to form a cup-shaped space for holding the electrode body. Then in a glove box filled with an argon atmosphere, the flat wound electrode body and the nonaqueous electrolyte solution were inserted into the cup-shaped space for holding the electrode body. Then the inside of the laminated sheathing body was vacuumed so that the inside of the separator was impregnated with the nonaqueous electrolyte solution, and the opening portion of the laminated sheathing body was sealed. In this way, a nonaqueous electrolyte secondary battery was produced with a height of 62 mm, a width of 35 mm, and a thickness of 3.6 mm (dimensions excluding the sealing portion). The design capacity of the obtained nonaqueous electrolyte secondary battery was 800 mAh with a charge cutoff voltage of 4.50 V (based on lithium).

[Structure of the Nonaqueous Electrolyte Secondary Battery]

The following describes the structure of a laminated nonaqueous electrolyte secondary battery common to Experimental Examples 1 to 15 with reference to FIG. 1. A laminated nonaqueous electrolyte secondary battery 10 has a laminated sheathing body 12, a flat-shaped wound electrode body 14 having a positive electrode plate and a negative electrode plate, a positive electrode collector tab 16 connected to the positive electrode plate of this wound electrode body 14, and a negative electrode collector tab 18 connected to the negative electrode plate of this wound electrode body 14. The wound electrode body 14 has a positive electrode plate, a negative electrode plate, and a separator each having the shape of a strip and has a structure in which the positive electrode plate and the negative electrode plate are wound with the separator therebetween so that they are isolated from each other.

The laminated sheathing body 12 has a recessed portion 22, and either end of the laminated sheathing body 12 is folded back to cover the opening portion of this recessed portion 22. The edge portion 24 extending around the recessed portion 22 and the portion folded back to face it are welded so that the inside of the laminated sheathing body 12 is sealed. The inside of the sealed laminated sheathing body 12 houses the wound electrode body 14 with a nonaqueous electrolyte solution.

The positive electrode collector tab 16 and the negative electrode collector tab 18 stick out of the sealed laminated sheathing body 12, each with a plastic component 26 as an intermediary. These positive and negative electrode collector tabs 16 and 18 mediate the supply of electric power to the outside. Between each of the positive and negative electrode collector tabs 16 and 18 and the laminated sheathing body 12, a plastic component 26 is interposed for the purposes of improved adhesion and the prevention of short circuits via the aluminum alloy layer of the laminated material.

[Determination of an Increase in Battery Thickness after High-Temperature Cycles]

The nonaqueous electrolyte secondary batteries according to Experimental Examples 1 to 15 obtained in this way were each subjected to the charge/discharge test described below, through which their percent retained capacity after high-temperature charge/discharge cycles was measured. First, the batteries were charged at 50° C. at a constant current of 1 It (=800 mA) until the battery voltage was 4.4 V (a positive electrode potential of 4.5 V based on lithium) and then, after the battery voltage reached 4.4 V, at a constant voltage of 4.4 V until 1/50 It (=16 mA) was reached. Then the batteries were discharged at a constant current of 1 It (=800 mA) until the battery voltage was 2.75 V, and the battery thickness D1 after the battery voltage reached 2.75 V was measured.

Then the batteries were repeatedly charged and discharged under the same conditions as above. The battery thickness D2 after the completion of 300 discharge processes was measured, and the increase D in battery thickness after high-temperature cycles was measured as the difference between D2 and D1. The measurement results in Experimental Examples 1 to 10 are summarized in Table 1, the measurement results in Experimental Examples 11 and 12 in Table 2 with those in Experimental Examples 1 and 7, and the measurement result in Experimental Example 13 in Table 3 with those in Experimental Examples 1 and 7. The presented increases D in battery thickness are relative values based on the increase in Experimental Example 6 (100%).

[Measurement of the Electrode Plate Surface Resistance]

In Experimental Examples 1, 4, 14, and 15, the produced positive electrode plate was cut out to a size of 20 mm×50 mm, and its electrical resistance was measured using the two-probe method to determine the electrical resistance of the surface of the positive electrode plate. The results of measurement in Experimental Examples 14 and 15 are summarized in Table 4 with those in Experimental Examples 4 and 1.

TABLE 1

| | PVdF | Ratio of conductive agent content to binder content | Active material content | Conductive agent content | Binder content | Increase (%) in battery thickness after high-temperature cycles |
|---|---|---|---|---|---|---|
| Experimental Example 1 | Carboxylated | 1.00 | 98.0 | 1.0 | 1.0 | 47 |
| Experimental Example 2 | " | 1.11 | 98.1 | 1.0 | 0.9 | 62 |

TABLE 1-continued

|  | PVdF | Ratio of conductive agent content to binder content | Active material content | Conductive agent content | Binder content | Increase (%) in battery thickness after high-temperature cycles |
|---|---|---|---|---|---|---|
| Experimental Example 3 | " | 1.33 | 98.25 | 1.0 | 0.75 | 61 |
| Experimental Example 4 | " | 1.67 | 97.6 | 1.5 | 0.9 | 70 |
| Experimental Example 5 | " | 1.00 | 97.6 | 1.2 | 1.2 | 50 |
| Experimental Example 6 | " | 0.75 | 96.5 | 1.5 | 2.0 | 100 |
| Experimental Example 7 | " | 1.00 | 95.0 | 2.5 | 2.5 | 103 |
| Experimental Example 8 | " | 0.90 | 98.1 | 0.9 | 1.0 | 125 |
| Experimental Example 9 | " | 0.94 | 96.9 | 1.5 | 1.6 | 200 |
| Experimental Example 10 | No carboxyl group | 1.00 | 97.6 | 1.2 | 1.2 | 113 |

Positive electrode active material, a lithium-cobalt composite oxide; negative electrode active material, graphite; dispersant, methyl cellulose

TABLE 2

|  | Positive electrode active material | Ratio of conductive agent content to binder content | Active material content | Conductive agent content | Binder content | Increase (%) in battery thickness after high-temperature cycles |
|---|---|---|---|---|---|---|
| Experimental Example 11 | $LiNi_{0.5}Co_{0.2}Mn_{0.3}O_2$ | 1.00 | 98.0 | 1.0 | 1.0 | 63 |
| Experimental Example 12 | " | 1.00 | 95.0 | 2.5 | 2.5 | 100 |
| Experimental Example 1 | $LiCoO_2$ | 1.00 | 98.0 | 1.0 | 1.0 | 47 |
| Experimental Example 7 | " | 1.00 | 95.0 | 2.5 | 2.5 | 103 |

PVdF, carboxylated; negative electrode active material, graphite; dispersant, methyl cellulose

TABLE 3

|  | Negative electrode active material | Ratio of conductive agent content to binder content | Active material content | Conductive agent content | Binder content | Increase (%) in battery thickness after high-temperature cycles |
|---|---|---|---|---|---|---|
| Experimental Example 13 | Silicon oxide-containing graphite | 1.00 | 98.0 | 1.0 | 1.0 | 51 |
| Experimental Example 1 | Graphite | 1.00 | 98.0 | 1.0 | 1.0 | 47 |
| Experimental Example 7 | " | 1.00 | 95.0 | 2.5 | 2.5 | 103 |

PVdF, carboxylated; positive electrode active material, a lithium-cobalt composite oxide; dispersant, methyl cellulose

TABLE 4

|  | Dispersant | Active material content | Conductive agent content | Binder content | Electrode plate surface resistance ($\Omega$) | Increase (%) in battery thickness after high-temperature cycles |
|---|---|---|---|---|---|---|
| Experimental Example 4 | Methyl cellulose | 97.6 | 1.5 | 0.9 | 535 | 70 |
| Experimental Example 14 | None | 97.6 | 1.5 | 0.9 | 1594 | 246 |

TABLE 4-continued

| | Dispersant | Active material content | Conductive agent content | Binder content | Electrode plate surface resistance (Ω) | Increase (%) in battery thickness after high-temperature cycles |
|---|---|---|---|---|---|---|
| Experimental Example 1 | Methyl cellulose | 98.0 | 1.0 | 1.0 | 803 | 47 |
| Experimental Example 15 | None | 98.0 | 1.0 | 1.0 | 2398 | 345 |

PVdF, carboxylated; positive electrode active material a lithium-cobalt composite oxide; negative electrode active material, graphite The results in Experimental Examples 1 to 5 demonstrate that the battery swelling after high-temperature cycles was dramatically reduced compared with the result in Experimental Example 6. This indicates that if the positive electrode mixture layer contains a dispersant, it is preferred that the content ratio of the conductive agent to the binder be 1.00-1.67 as long as the content of the positive electrode active material in the positive electrode mixture layer is 97% by mass or more.

The results in Experimental Examples 8 and 9 indicate that if the content ratio of the conductive agent to the binder is less than 1.0, the above-mentioned advantage is not obtained regardless of whether the content of the positive electrode active material in the positive electrode mixture layer is 97% by mass or more or less than 97% by mass, and in fact the battery swelling increases compared with the result in Experimental Example 6.

The result in Experimental Example 7 indicates that even if the content ratio of the conductive agent to the binder is 1.00, the above-mentioned advantage is not obtained as long as the content of the positive electrode active material in the positive electrode mixture layer is less than 97% by mass.

The results in Experimental Examples 11 and 12 presented in Table 2 indicate that when the results in Experimental Examples 1 and 7 are also compared, the above-mentioned advantage, i.e., a dramatic reduction of the battery swelling after high-temperature cycles achieved when the content of the positive electrode active material in the positive electrode mixture layer is 97% by mass or more, is offered not only when a lithium-cobalt composite oxide is used as a positive electrode active material, and a similar advantage is provided when a cobalt-containing lithium-nickel-manganese composite oxide is used.

The result in Experimental Example 13 presented in Table 3 indicates that when the results in Experimental Examples 1 and 7 are also compared, the above-mentioned advantage, i.e., a dramatic reduction of the battery swelling after high-temperature cycles achieved when the content of the positive electrode active material in the positive electrode mixture layer is 97% by mass or more, is offered not only when graphite is used as a negative electrode active material, and a similar advantage is provided when silicon oxide-containing graphite is used.

The composition of the positive electrode mixture layers in Experimental Examples 14 and 15 presented in Table 4 is the same as that of the positive electrode mixture layers in Experimental Examples 4 and 1, respectively, except that the positive electrode active material mixture slurry was prepared without methyl cellulose as a dispersant in the NMP. The surface resistance of the positive electrode plate in Experimental Example 14 was much greater than that in Experimental Example 4, and the surface resistance of the positive electrode plate in Experimental Example 15 was much greater than that in Experimental Example 1. This suggests the possibility that the magnitude of the surface resistance of the positive electrode plate can be viewed as a measure of the dispersibility of the conductive agent.

In more specific terms, the reduced battery swelling in Experimental Examples 1 and 4, observed despite the fact that the content of the positive electrode active material in the positive electrode mixture layer was more than 97% by mass, appears to be because the effective function of the methyl cellulose added to the NMP solution during the preparation of the positive electrode active material mixture slurry as a dispersant ensured sufficient dispersibility of the conductive agent and the binder in spite of their relatively small amounts, thereby reducing the surface resistance.

Furthermore, the problem with conventional nonaqueous electrolyte secondary batteries, i.e., the cycle characteristics being affected when the content of the positive electrode active material is increased to improve the battery capacity per volume or per mass, seems to be associated with the failure to ensure sufficient dispersibility of the conductive agent and the binder (=a high surface resistance). When this is considered through interpolation from the measured surface resistance of the positive electrode plate in Table 4, it will be found preferred that the surface resistance of the positive electrode be 900Ω or less. A surface resistance more than 900Ω, a resistance so large that the positive electrode active material is prevented from smoothly storing and releasing lithium, leads to reduced cycle characteristics as demonstrated in Experimental Examples 14 and 15.

Although Experimental Examples 1 to 9 and 11 to 15 above illustrate examples where a PVdF containing a carboxyl group was used as a binder, a PVdF containing a carboxyl group derivative can also be used. Experimental Examples 1 to 11 and 13 above illustrate examples where methyl cellulose was used as a dispersant, but water-soluble cellulose esters such as hydroxyethyl methyl cellulose and hydroxypropyl methyl cellulose and polyvinyl propanol can also be used.

Experimental Examples 1 to 15 above illustrate examples where a lithium-cobalt composite oxide and a cobalt-containing lithium-nickel-manganese composite oxide were used as positive electrode active materials. In the present invention, however, it is possible to use one or a mixture of two or more of lithium-transition metal composite oxides capable of reversibly storing and releasing lithium ions and represented by $LiMO_2$ (where M is at least one of Co, Ni, and Mn), namely $LiNiO_2$, $LiNi_yCo_{1-y}O_2$ (y=0.01-0.99), $LiMnO_2$, and $LiCo_xMn_yNi_zO_2$ (x+y+z=1), $LiMn_2O_4$ or $LiFePO_4$, and similar compounds as a positive electrode active material. Lithium-cobalt composite oxides doped with other metal elements, such as zirconium, magnesium, and aluminum, can also be used.

Moreover, Experimental Examples 1 to 15 above illustrate examples where graphite and silicon oxide-containing graphite were used as negative electrode active materials, but the negative electrode active material can be any material capable of reversibly storing and releasing lithium. Titanium oxides such as $LiTiO_2$ and $TiO_2$, metalloid elements such as silicon and tin, or Sn—Co alloys and similar materials can be used.

Examples of nonaqueous solvents that can be used in nonaqueous electrolyte secondary batteries according to the present invention include cyclic carbonates such as ethylene carbonate (EC), propylene carbonate (PC), and butylene carbonate (BC), fluorinated cyclic carbonates, cyclic carboxylates such as γ-butyrolactone (γ-BL) and γ-valerolactone (γ-VL), linear carbonates such as dimethyl carbonate (DMC), ethyl methyl carbonate (EMC), diethyl carbonate (DEC), methyl propyl carbonate (MPC), and dibutyl carbonate (DBC), fluorinated linear carbonates, linear carboxylates such as methyl pivalate, ethyl pivalate, methyl isobutyrate, and methyl propionate, amide compounds such as N,N'-dimethylformamide and N-methyl oxazolidinone, sulfur compounds such as sulfolane, and room temperature molten salts such as 1-ethyl-3-methylimidazolium tetrafluoroborate. It is desirable to use two or more of these in mixture. Among these, it is preferred to use a cyclic carbonate and a linear carbonate in mixture, especially in light of dielectric constant and ion conductivity.

In the present invention, furthermore, lithium salts generally used as an electrolytic salt in nonaqueous electrolyte secondary batteries can be used as an electrolytic salt to be dissolved in the nonaqueous solvent. Examples of such lithium salts include $LiPF_6$, $LiBF_4$, $LiCF_3SO_3$, $LiN(CF_3SO_2)_2$, $LiN(C_2F_6SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and similar compounds as well as mixtures of these. In particular, $LiPF_6$ (lithium hexafluorophosphate) is especially preferred. It is preferred that the amount of the electrolytic salt dissolved in the nonaqueous solvent be 0.8-1.5 mol/L.

Furthermore, Experimental Examples 1 to 15 illustrate examples of laminated nonaqueous electrolyte secondary batteries so that the increase in battery thickness can be seen well, but the present invention can also be applied to cylindrical nonaqueous electrolyte secondary batteries and prismatic nonaqueous electrolyte secondary batteries in which a metal sheathing can is used.

The invention claimed is:

1. A nonaqueous electrolyte secondary battery comprising:
   a positive electrode plate having a positive electrode mixture layer formed thereon, the positive electrode mixture layer containing a positive electrode active material which stores and releases a lithium ion, a conductive agent, a binder, and a dispersant,
   a negative electrode plate having a negative electrode mixture layer formed thereon, the negative electrode mixture layer containing a negative electrode active material which stores and releases a lithium ion,
a nonaqueous electrolyte solution, and
a separator;
   the dispersant being selected from the group consisting of methyl cellulose, hydroxyethyl methyl cellulose, hydroxypropyl methyl cellulose, and polyvinyl propanol, a content of the positive electrode active material in the positive electrode mixture layer being from 97% by mass or more to 98.25% by mass;
   a content ratio of the conductive agent to the binder in the positive electrode mixture layer being 1.00-1.67; and
   the binder being composed of a polyvinylidene fluoride having, as a terminal functional group, one selected from the group consisting of a carboxyl group and a carboxyl group derivative.

* * * * *